United States Patent
Perez

(10) Patent No.: US 9,754,175 B2
(45) Date of Patent: Sep. 5, 2017

(54) ACQUIRING IDENTITY SIGNATURES FROM BIOLOGICAL STRUCTURES

(71) Applicant: Verizon Patent and Licensing Inc., Basking Ridge, NJ (US)

(72) Inventor: John Scott Perez, Tampa, FL (US)

(73) Assignee: Zentry, LLC, Bridgewater, NJ (US)

( * ) Notice: Subject to any disclaimer, the term of this patent is extended or adjusted under 35 U.S.C. 154(b) by 11 days.

(21) Appl. No.: 14/155,478

(22) Filed: Jan. 15, 2014

(65) Prior Publication Data

US 2015/0199580 A1    Jul. 16, 2015

(51) Int. Cl.
*G06K 9/00* (2006.01)
*G06F 21/32* (2013.01)

(52) U.S. Cl.
CPC ......... *G06K 9/00885* (2013.01); *G06F 21/32* (2013.01); *G06K 9/00899* (2013.01); *G06K 2009/00939* (2013.01)

(58) Field of Classification Search
None
See application file for complete search history.

(56) References Cited

U.S. PATENT DOCUMENTS

| | | | | |
|---|---|---|---|---|
| 2003/0133596 A1* | 7/2003 | Brooks | ............... | G06K 9/00 382/115 |
| 2007/0238991 A1* | 10/2007 | Amararene | ............... | A61B 8/00 600/437 |
| 2010/0328033 A1* | 12/2010 | Kamei | ............... | A61B 8/0875 340/5.82 |
| 2013/0215275 A1* | 8/2013 | Berini | ............... | G06F 21/32 348/150 |
| 2015/0063532 A1* | 3/2015 | Andrews | ............... | G01N 23/046 378/19 |

\* cited by examiner

*Primary Examiner* — Fred Hu
(74) *Attorney, Agent, or Firm* — Zentry, LLC; Frederick W Dour

(57) ABSTRACT

A method includes aligning a transmitter and receiver to transmit signals through a body part of a person and transmitting, by the transmitter and through the body part, analog signals of known transmission signal strengths. The method also includes receiving, by the receiver, the analog signals after the analog signals have passed through the body part, and identifying the received signal strengths of the analog signals at the receiver. The method calculates attenuation values between the transmission signal strengths and the received signal strengths to generate an identity signature based on biometry.

20 Claims, 14 Drawing Sheets

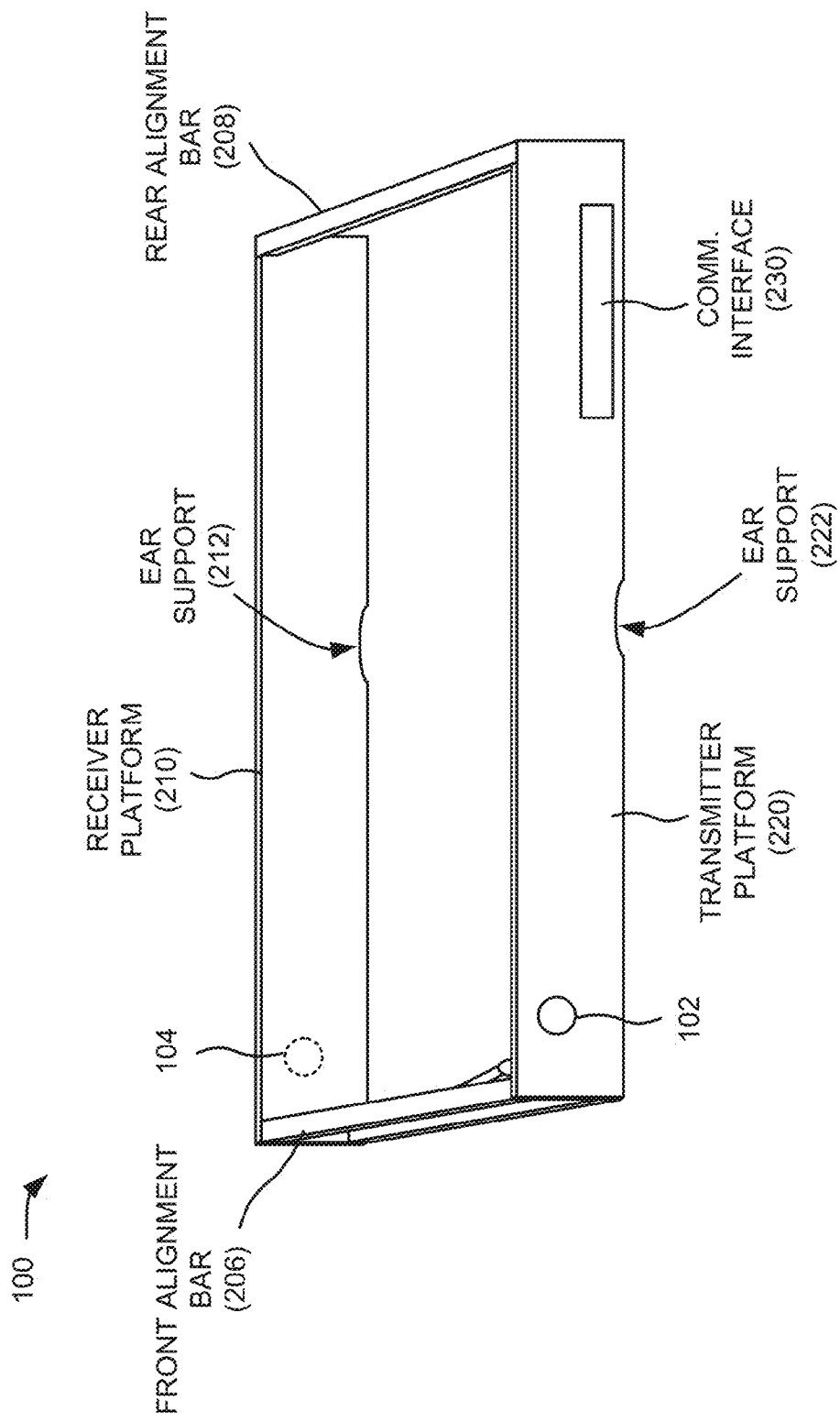

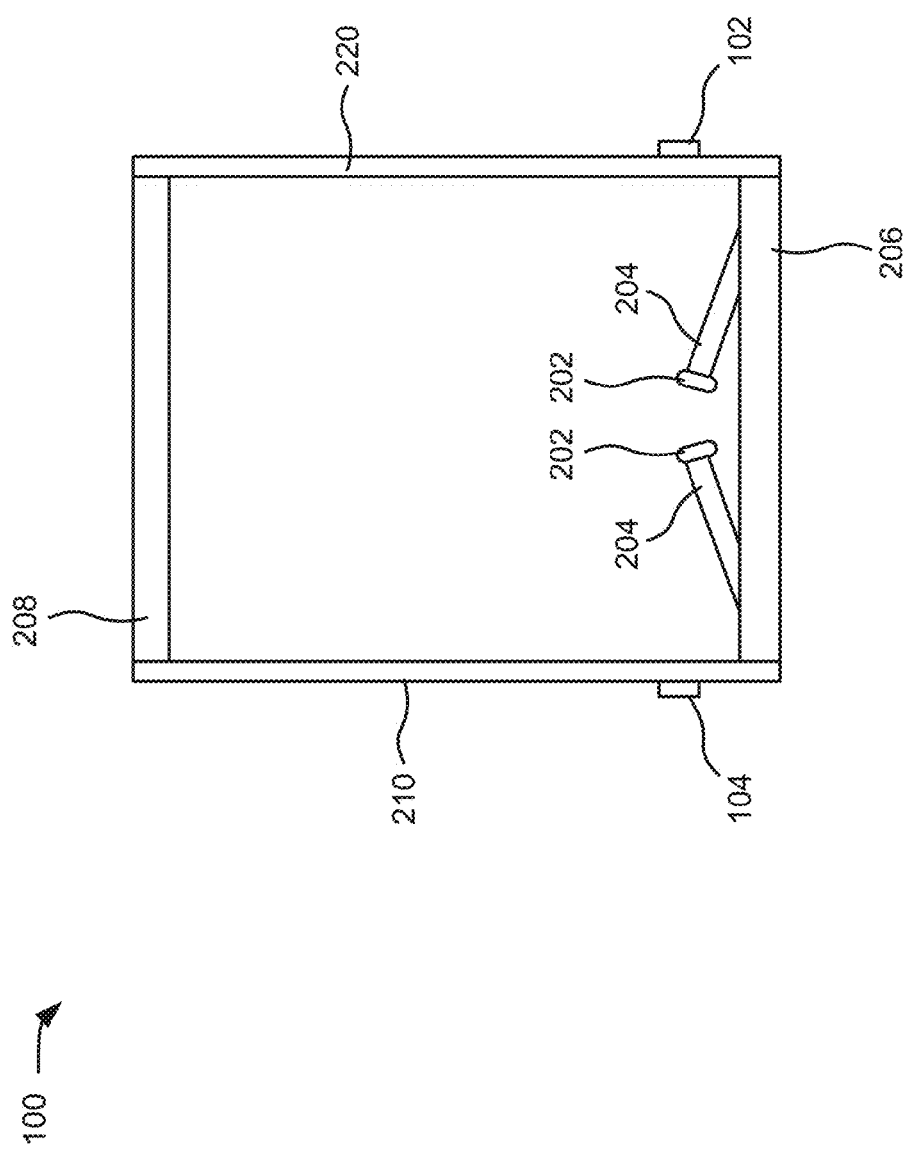

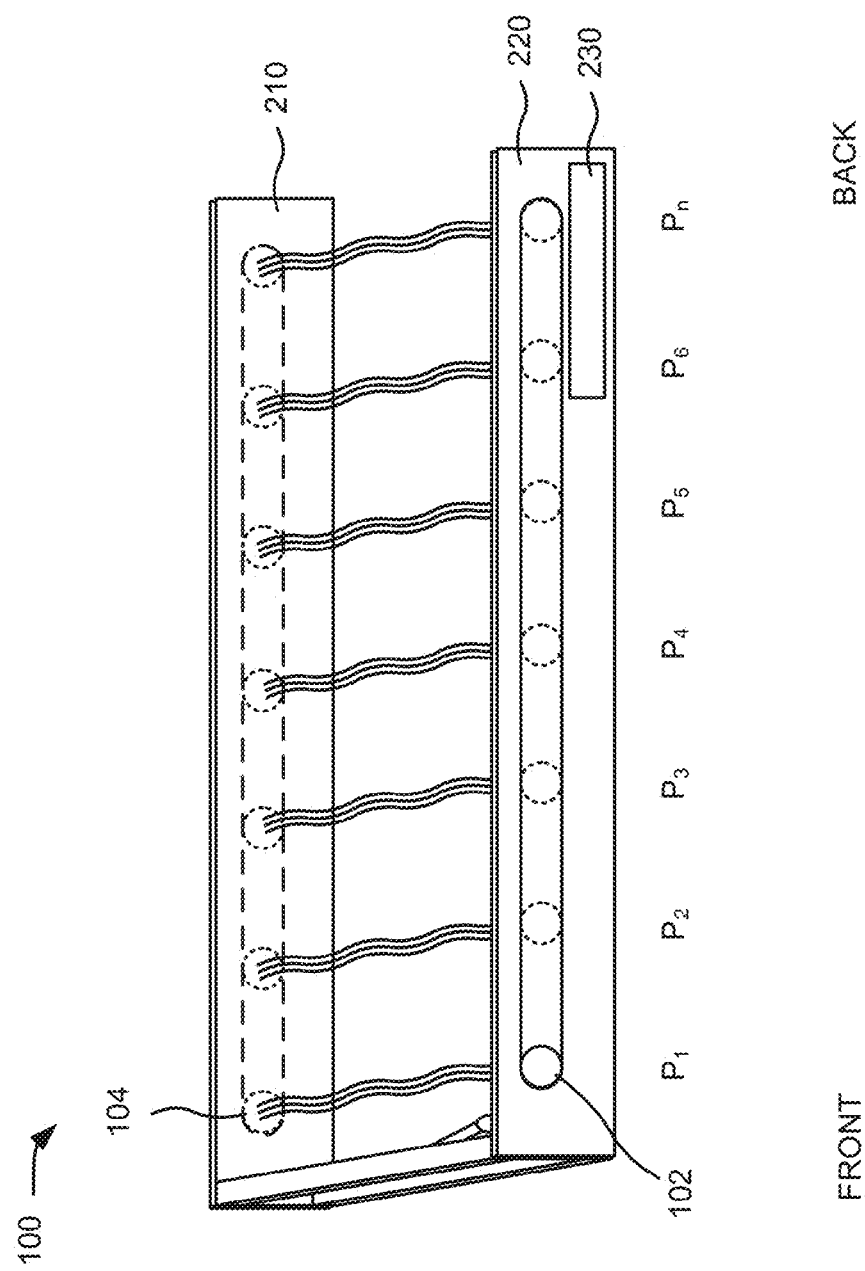

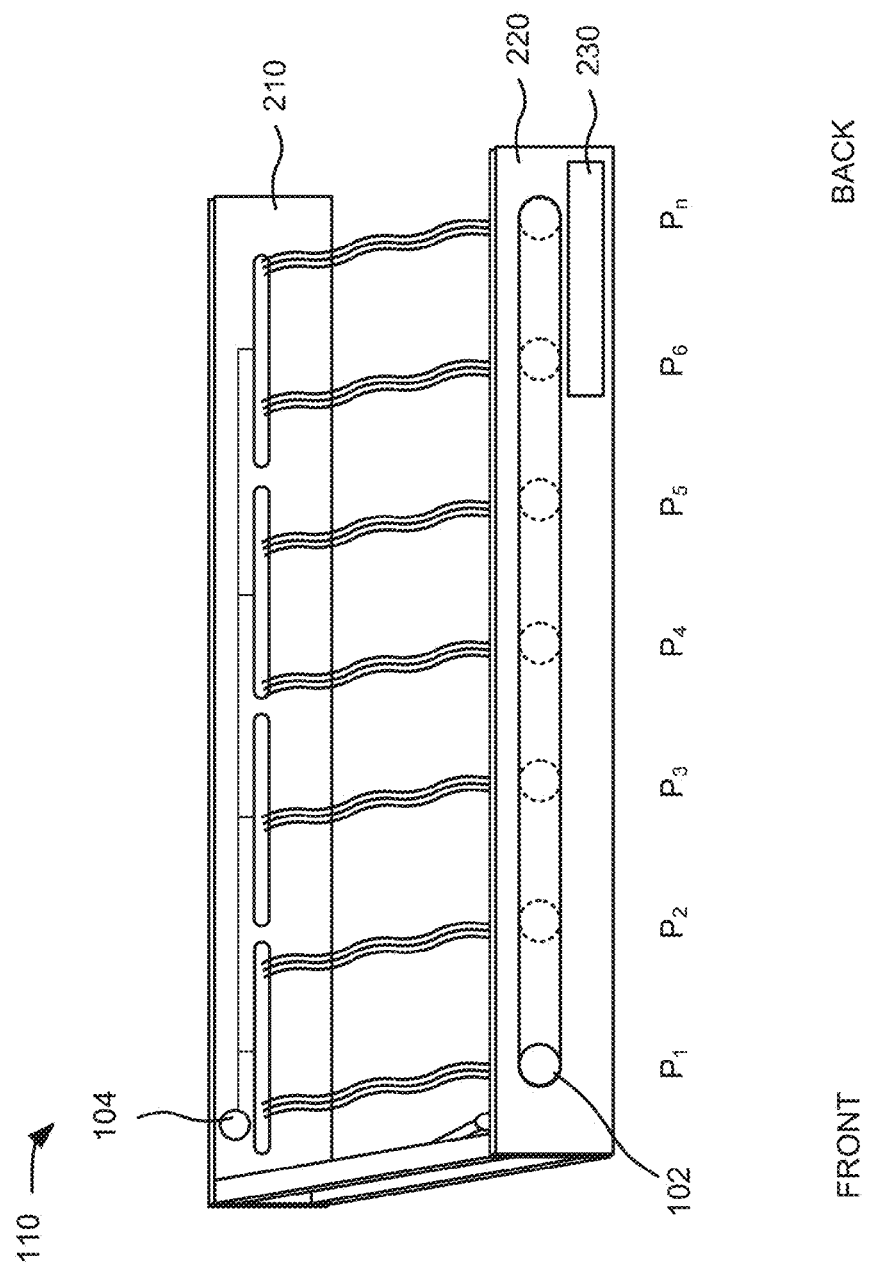

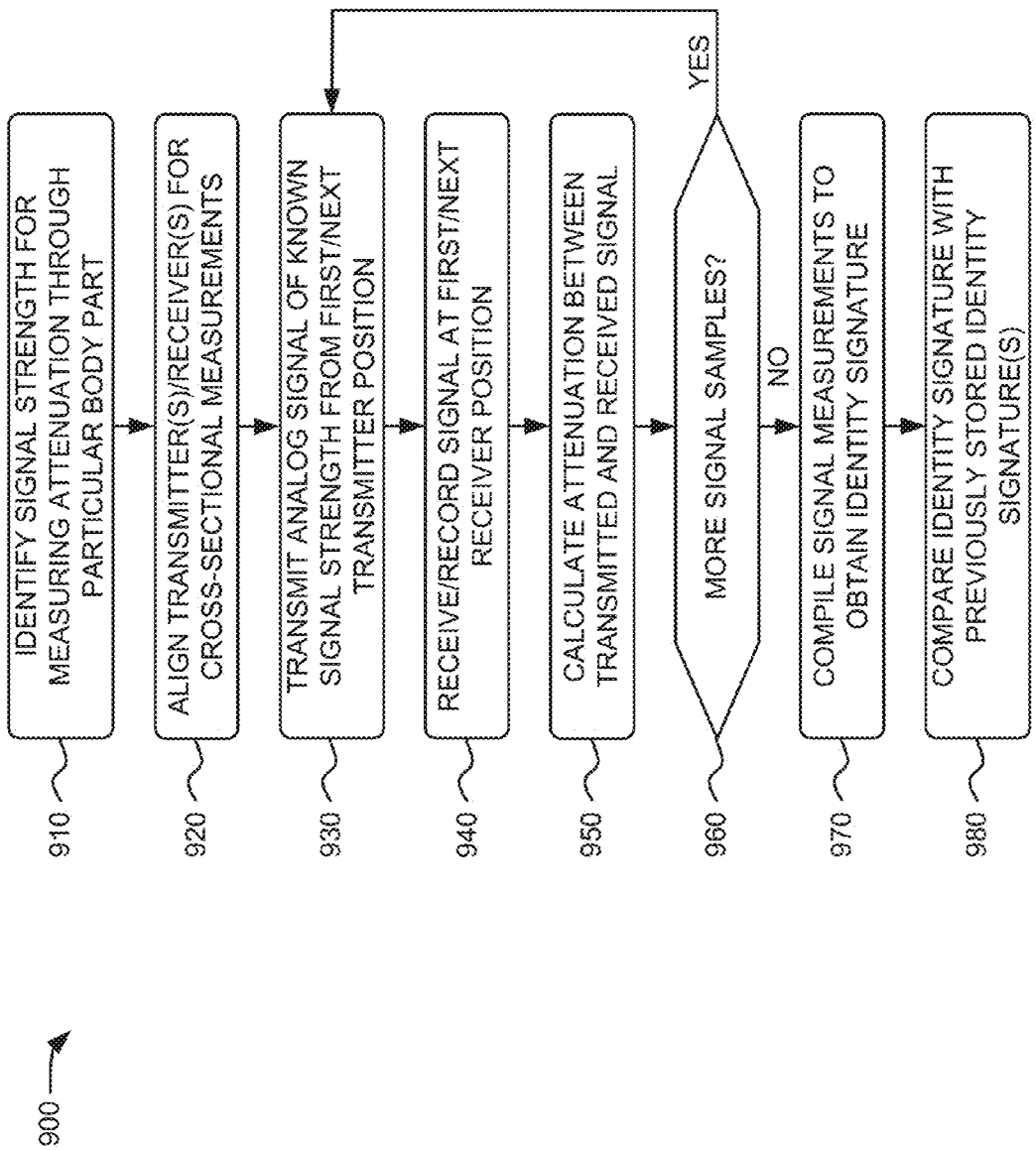

ACQUIRING IDENTITY SIGNATURES FROM BIOLOGICAL STRUCTURES

BACKGROUND

Biometric identity refers to the identification of persons by their characteristics or traits. Biometrics can be used as a form of identification and access control. Today, the security market is trending toward the Biometric Identity space because it makes it more complex to spoof authentication and access control when a person's credentials can be tied to their physical biological makeup.

BRIEF DESCRIPTION OF THE DRAWINGS

FIGS. 3A and 3B are a side isometric view and a top view, respectively, of the device of FIG. 2;

FIGS. 4A-4D are simplified schematics of different data collection techniques that may be applied to embodiments of the device of FIG. 2 according to implementations described herein;

FIG. 9 is a flow diagram of an exemplary process for detecting a biometric identity via signal attenuation, according to an implementation described herein.

DETAILED DESCRIPTION OF PREFERRED EMBODIMENTS

The following detailed description refers to the accompanying drawings. The same reference numbers in different drawings may identify the same or similar elements.

Systems and methods described herein may detect a biometric identity signature from a human body part, such as a head or hand. The biometric identity signature, also referred to herein as a biometry index, may be based on the physical structure of the body part using attenuation measurements of analog signals transmitted across multiple reference points.

According to an implementation, a method may include aligning a transmitter and receiver to transmit signals through a body part of a person and transmitting, by the transmitter and through the body part, analog signals of known transmission signal strengths. The method may also include receiving, by the receiver, the analog signals after the analog signals have passed through the body part, and identifying the received signal strengths of the analog signals at the receiver. The method may calculate attenuation values between the transmission signal strengths and the received signal strengths to generate an identity signature for the person. In one implementation, multiple attenuation values taken across different sections of a body part may be used to make up a biometry index, which defines a person's identity.

Figure 1:
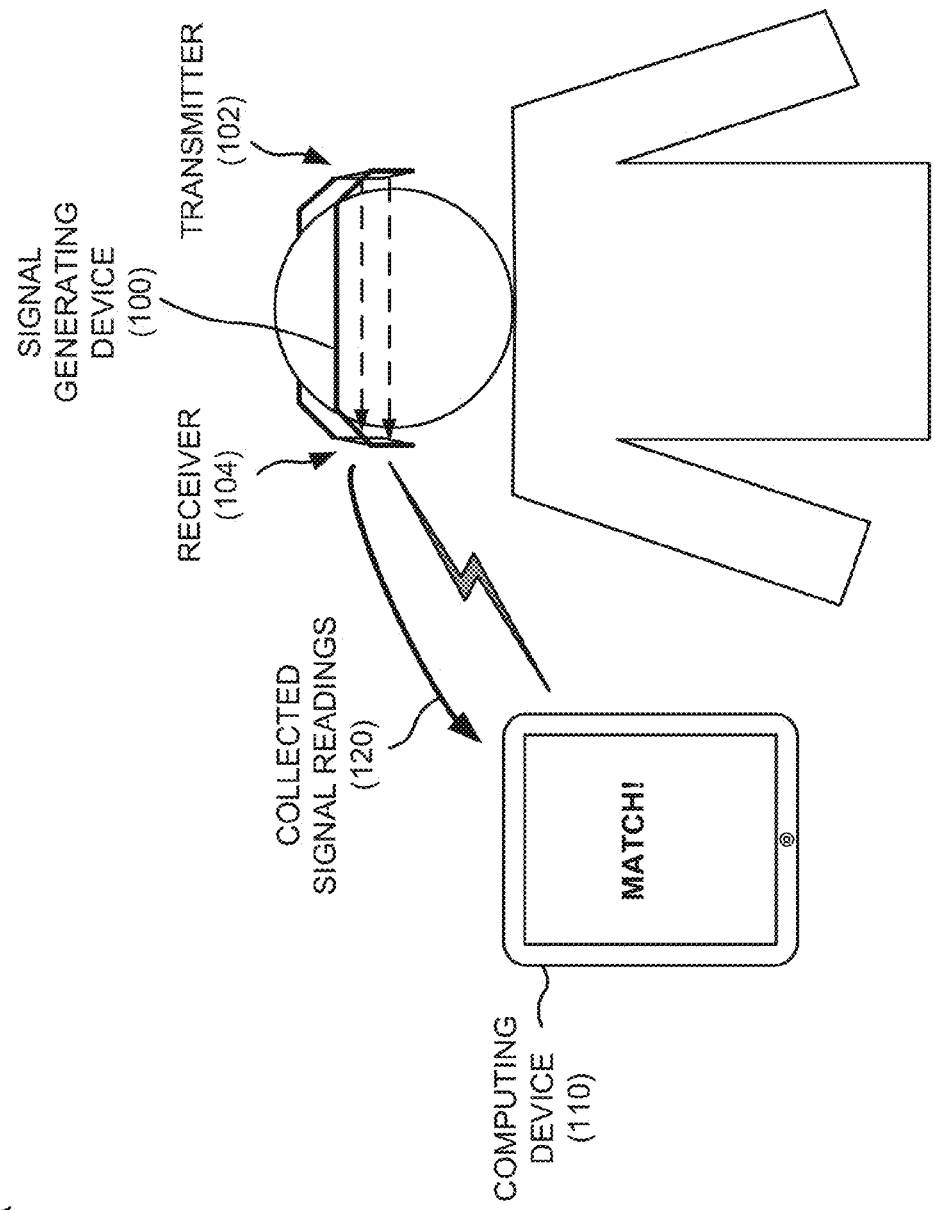
FIG. 1 is an exemplary environment in which systems and/or methods described herein may be implemented.

FIG. 1 is an environment 10 in which systems and/or methods described herein may be implemented. As illustrated, environment 10 may include signal generating device 100 that includes at least one transmitter 102 and at least one receiver 104. In one implementation, signal generating device 100 may be configured as a wearable device for a person. Signal generating device 100 may be in wired or wireless communication with a computing device 110.

Generally, transmitter 102 may be configured to transmit pulse analog radio frequency (RF) signals through a portion of a person to corresponding receiver 104. Transmitted signals may include, for example, medium, high, or very high frequency signals (e.g., 1 MHz to 100 MHz, but not limited to that range). The signals are configured to be weak in nature such that the signal to noise (S/N) ratio will change as the analog signal traverses the body part due to attenuation of the signal. The transmitted signal may be compared to the received signal to determine a loss for the signal. The loss of signal due to attenuation is a function of the biological material (e.g., of the person) between transmitter 102 and receiver 104. Multiple signal types may be used to create signatures specific to specific types of biological material. Samples may be taken from multiple locations of signal generating device 100. For example, transmitter 102 and/or receiver 104 may move within the structure of signal generating device 100 to generate samples at multiple points across the portion of a person.

Signal data from transmitter 102 and receiver 104 may be provided to computing device 110 for processing, as indicated by reference 120. In particular, computing device 110 may calculate signal loss for the multiple samples obtained from signal generating device 100 and determine a biological identity signature. Computing device 110 may store a baseline biological identity signature, and may compare subsequent samples against the baseline biological identity signature to authenticate a person.

In the configuration shown in FIG. 1, signal generating device 100 may be configured to be placed horizontally proximal to the brain in the same position so as to take an identical sample set over multiple instances. In other configurations described herein, signal generating device 100 may be configured to measure signal attenuation across other body parts.

As described further herein, the human head and brain matter within each signal sampling cross section (e.g., between transmitter 102 and receiver 104 of signal generating device 100) can differ based on the content and type of tissue in scope for each signal sampling. A single sampling of the brain structure by signal generating device 100 is directly related to the structural content of the person being analyzed. By collecting multiple attenuation samplings, signal generating device 100 may create a "brainprint" (e.g., a biometry index for the brain) that is composed of the attenuation across the human head horizontally from the front to the back of the head. Each attenuation number may represent a constant structure of the head and brain material measured. The brain material of the human brain differs regionally from the front to the back of the head. There are size and tissue differences within the human brain's structure. The attenuation measurements are taken as a derivative of the sum from the cross section samplings and combined into the "brainprint," composed of many regional samplings, that is unique to the person being analyzed.

Figure 2:
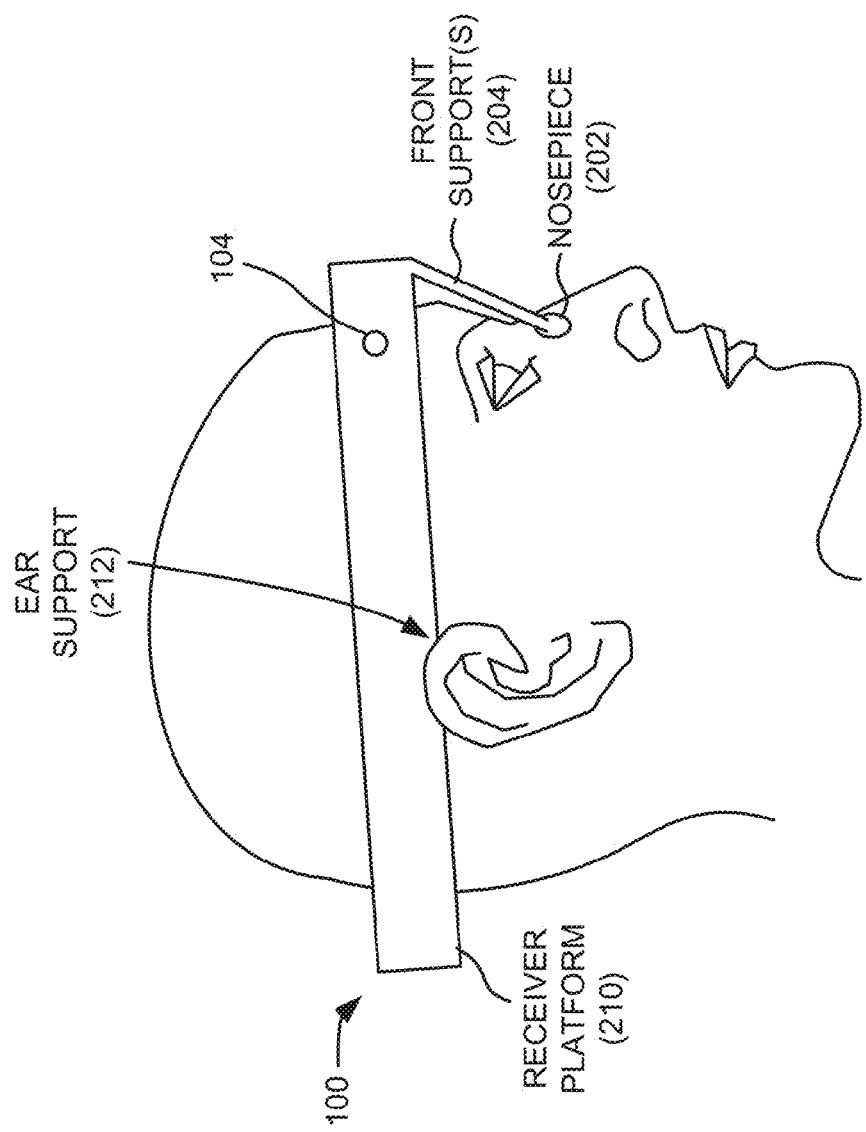
FIG. 2 is a simplified schematic of a device to collect attenuated signal information from a person's head.

FIG. 2 is a simplified schematic of signal generating device 100 positioned to collect attenuated signal information from a person's head. FIG. 3A is a side isometric view of signal generating device 100, and FIG. 3B is a top view of signal generating device 100. Referring collectively to FIGS. 2-3B, signal generating device 100 may include transmitter 102, receiver 104, nosepieces 202, front supports 204, an front alignment bar 206, a rear alignment bar 208, a receiver platform 210 with an ear support 212, a transmitter platform 220 with an ear support 222, and a communications port 230.

Generally, signal generating device 100 may be used to create a repeatable signature set of signals that are transmitted through a person's head. Signal generating device 100 can easily be placed on a person's head quickly and it sits on the nose and ears. Nosepieces 202, front supports 204, ear support 212, and ear support 222 may be configured provide consistent positioning of signal generating device 100 on a person's head. In one implementation, nosepieces 202, front supports 204, ear support 212, and/or ear support 222 may be adjusted as part of an initial fitting (e.g., similar to adjusting a pair of glasses) so that signal generating device 100 rests comfortably on a person's ears and the bridge of the person's nose.

In one implementation, transmitter 102 may move along transmitter platform 220 (e.g., from left to right as shown in FIG. 3A) to direct analog signals toward receiver platform 210. Transmitter 102 may move along a gear, a screw drive, a track, or another mechanism (not shown). Similarly, in one implementation, receiver 104 may move along receiver platform 210 (e.g., also from left to right as shown in FIG. 3A) to receive signals directly across from transmitter 102. In another implementation, it is not necessary to have receiver 104 move because receiver 104 may comprise an antenna that covers the length of receiver platform 210.

In one implementation, transmitter 102 may transmit signals of different strength from different positions along transmitter platform 220. For example, transmitter 102 may provide slightly stronger signals where more tissue would be present between receiver platform 210 and transmitter platform 220 (e.g., corresponding to the area between ear supports 212 and 222) and slightly weaker signals where less tissue would be present between receiver platform 210 and transmitter platform 220 (e.g., corresponding to the areas near front alignment bar 206 and rear alignment bar 208.

Front alignment bar 206 and rear alignment bar 208 may be configured to provide a consistent alignment of receiver platform 210 and transmitter platform 220. Particularly, receiver platform 210 and transmitter platform 220 may be positioned parallel to each other to maintain a fixed distance between transmitter 102 and receiver 104 (e.g., as transmitter 102 and receiver 104 move along transmitter platform 220 and receiver platform 210, respectively. In another implementation, front alignment bar 206 and rear alignment bar 208 may be adjustable to vary the distance (e.g., width) between receiver platform 210 and transmitter platform 220, so as to accommodate different size heads while maintaining parallel alignment of receiver platform 210 and transmitter platform 220.

Communications interface 230 may provide a wired and/or wireless interface to report signal readings, such as transmitted signal strength(s) from transmitter 102 and received signal strength(s) from receiver 104. Signal strength readings may be measured, for example, in decibels (dB). Communications interface 230 also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form. In one implementation, communications interface 230 may report signal readings to computing device 110 for processing.

FIGS. 4A-4D are simplified schematics of different data collection techniques that may be applied to embodiments of signal generating device 100.

FIG. 4A depicts an embodiment of signal generating device 100 in which both transmitter 102 and receiver 104 may move along signal generating device 100 to collect signal samples. Referring to FIG. 4A, transmitter 102 may send n (where n is greater than one) analog RF signals to receiver 104 beginning at a position in the front of the head. The signals sent are selectively configured to be weak in nature such that the signal to noise ratio (S/N) will change as the analog signal traverses a person's head (including the brain) from the left side (with transmitter platform 220) to the right side (with receiver platform 210) due to attenuation of the signal. The first signal received by receiver 104 may be compared to the first signal sent from a first position ($P_1$). The loss of signal due to attenuation will be a function of the biological material between transmitter 102 and receiver 104 of the signal generating device 100. Transmitter 102 may then move to a second position ($P_2$) further towards the back of the head and repeat the signaling process. The sampling re-occurs at a number of positions as transmitter 102 moves towards the back of the brain and signal generating device 100. More positions used in the sampling process create a larger number of identity points of reference for the brain-print used in the sampling process. In one implementation, signal generating device 100 may be tunable to collect a variable number of samplings based, for example, on software settings.

Figure 4B:
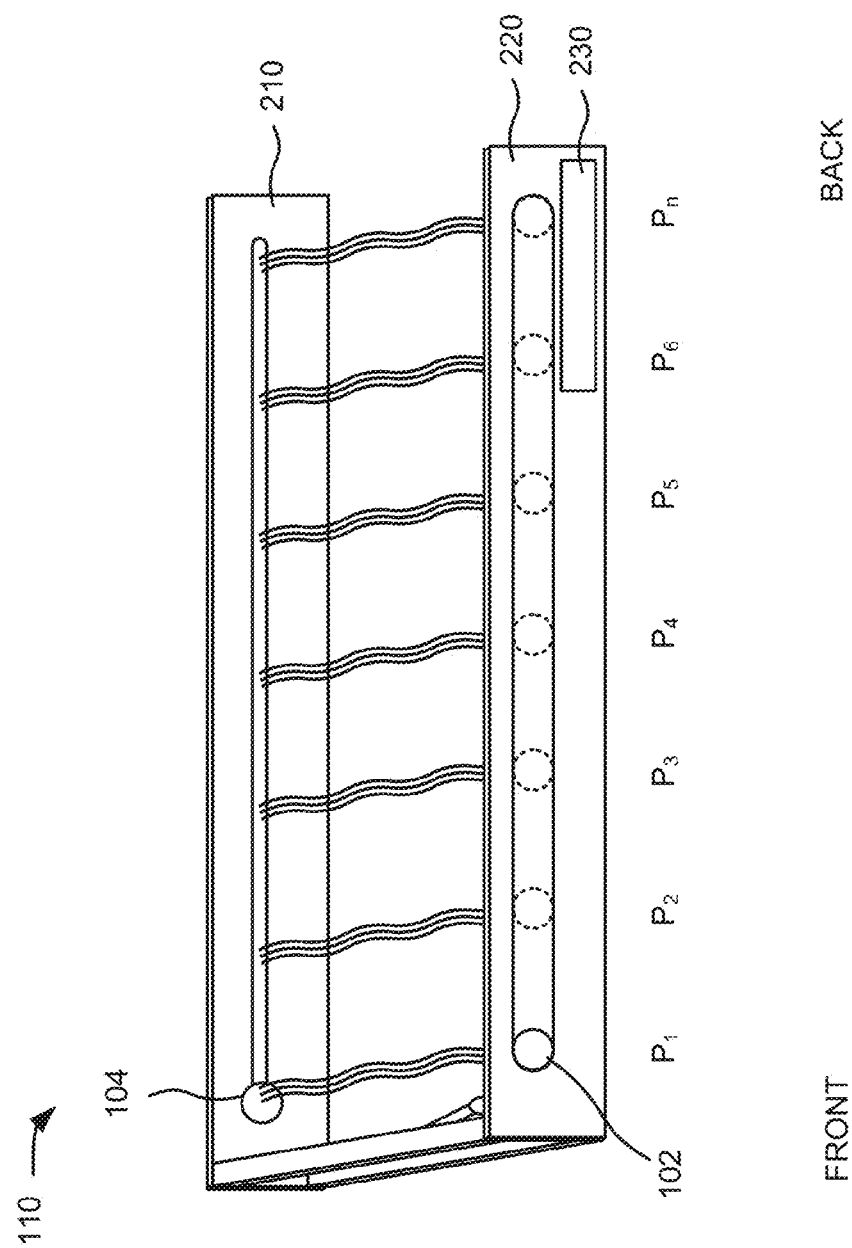

FIG. 4B depicts an embodiment of signal generating device 100 in which transmitter 102 moves along signal generating device 100 to transmit signals to a fixed antenna of receiver 104. In the configuration of FIG. 4B, receiver 104 may include a fixed antenna. Signal transmissions from multiple positions (e.g., $P_1$ through $P_n$) of transmitter 102 may be received assuming a shortest path from transmitter 102 to receiver 104.

FIG. 4C depicts an embodiment of signal generating device 100 in which transmitter 102 moves along signal generating device 100 to transmit signals to another fixed antenna of receiver 104. In the configuration of FIG. 4C, receiver 104 may include a multiple-input and multiple-output (MIMO) antenna. Signal transmissions from multiple positions (e.g., $P_1$ through $P_n$) of transmitter 102 may be received by different antenna portions of receiver 104.

Figure 4D:
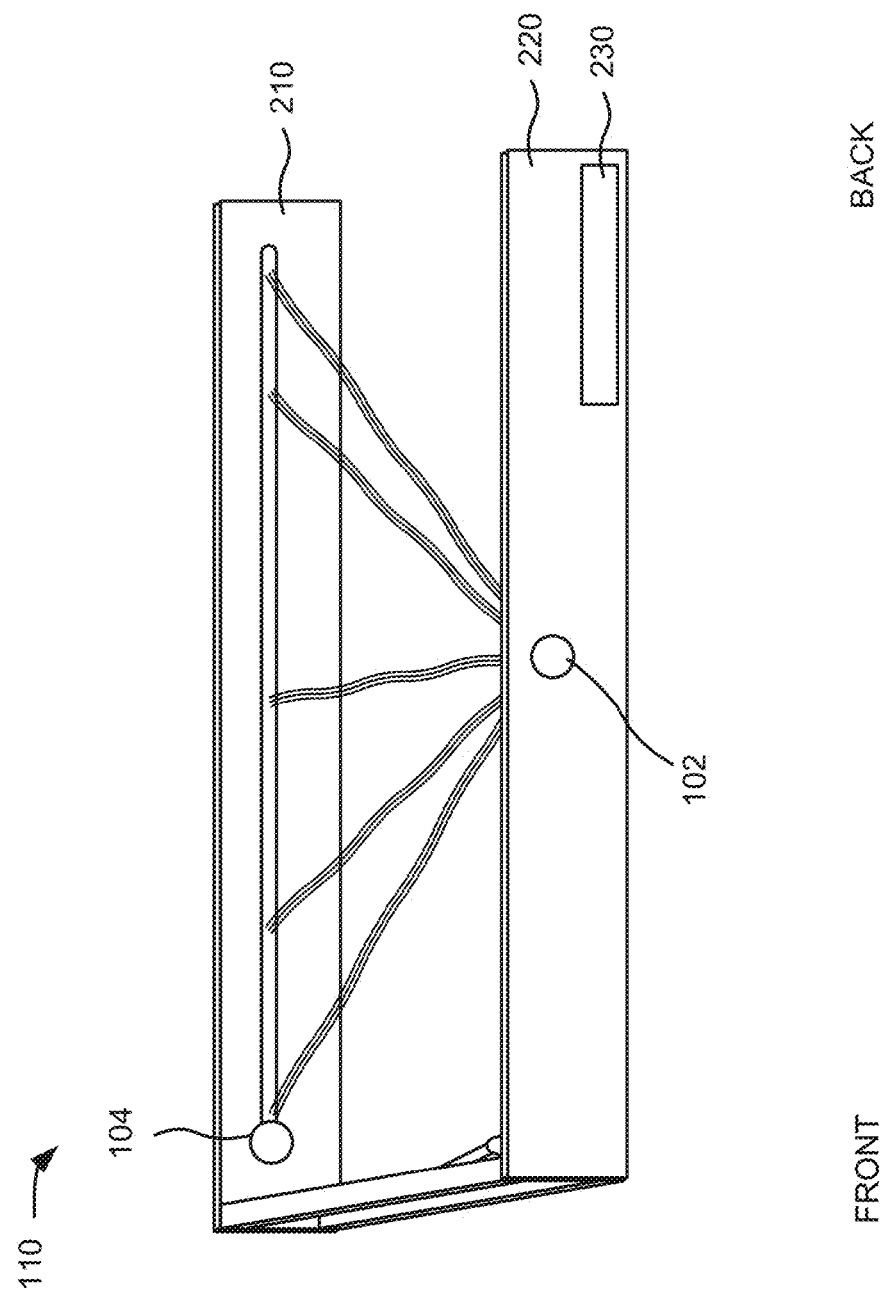

FIG. 4D depicts an embodiment of signal generating device 100 in which both transmitter 102 and receiver 104 are fixed within signal generating device 100. As shown in FIG. 4D, transmitter 102 may be fixed at a single point to transmit multiple signals with a trajectory to different points on receiver 104 (through different portions of a persons head)

Figure 5:
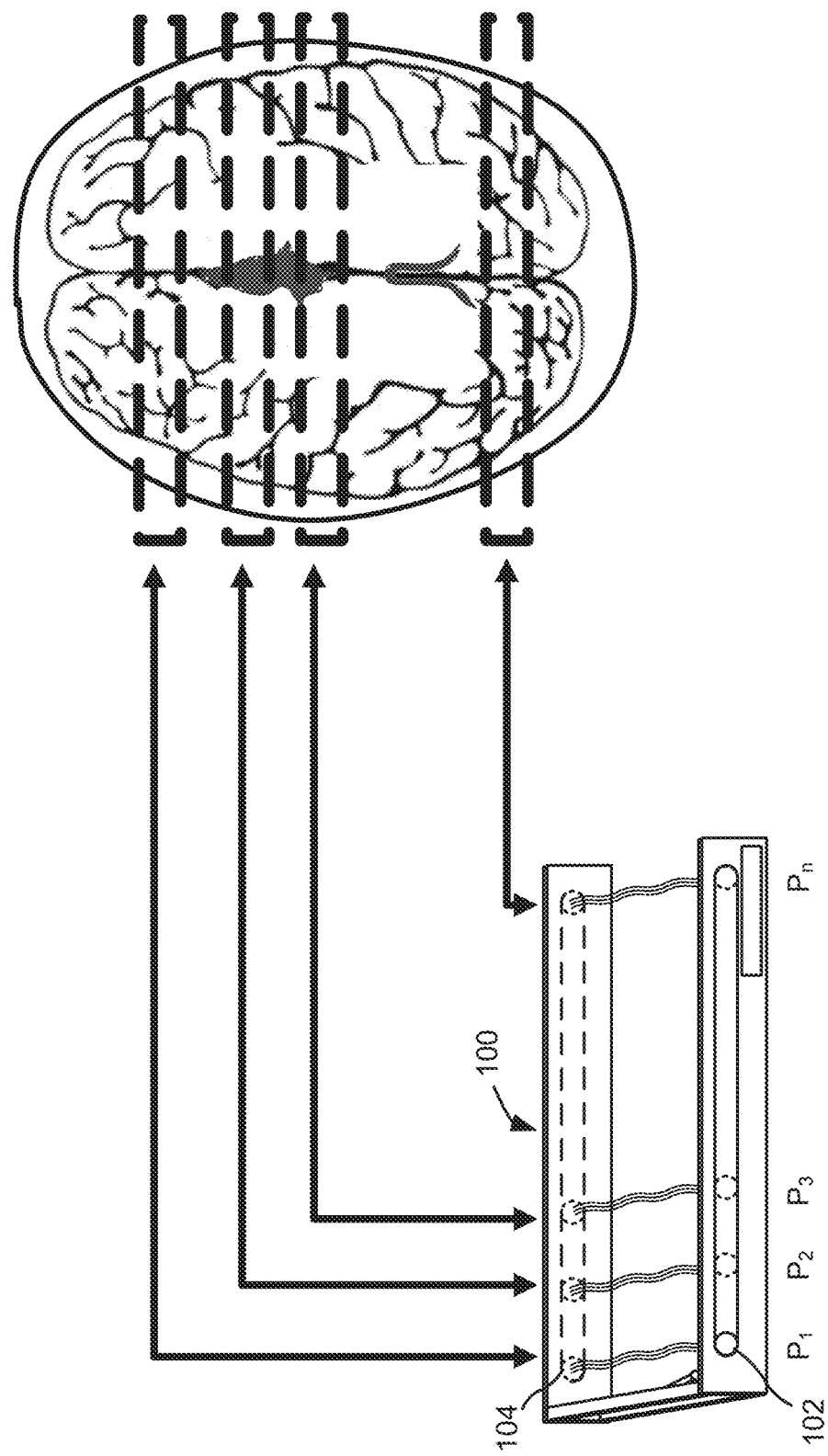
FIG. 5 is a simplified schematic relating signal measurements to physical attributes of a person's head, according to implementation described herein.

FIG. 5 provides a schematic relating signal sampling from signal generating device 100 to a cross-section of person's head. Sampled signals from each reference point $P_1$ through $P_n$ in FIG. 4A (or any of FIGS. 4B-4D) that may traverse regional brain tissues shown and may be directly related to magnetic resonance imaging (MRI) data collected for the same person.

The structure observed in the cross section of the human brain as shown in FIG. 5 shows cellular material that makes up the brain tissues. Those tissues collectively have specific attenuation coefficients. The sum of those attenuation coefficients is what attenuates the signals sent by the signal generating device 100 at the corresponding reference points $P_1$ through $P_n$.

Typically the use of spectroscopic methods for analysis (e.g., for healthcare) requires a good signal to noise ratio so that the signaling can be used to cleanly identify the subject of the chemical analysis. MRI requires the use of strong magnets to quantum energize the protons of cells for the purpose of creating a strong radio signal. Implementations described herein, however, benefit from use of a relatively weaker signal in a non quantum state. Weak signals will attenuate based on the biological cellular material in the path of the pulsed signal sent horizontally from the transmitter platform 220 side of signal generating device 100 to the receiver platform side 210. Energy from the signal used herein is lost because the cellular matter is not in an excited quantum energy state induced by magnetism and radio waves. Reflected energy is not being measured like ultrasound methods either. The signaling impact of the attenuation coefficient may be expressed as:

$$\text{Attenuation} = \alpha[\text{dB}/(\text{MHz·cm})] \cdot L[\text{cm}] \cdot f[\text{MHz}]$$

where $\alpha$ is the attenuation coefficient, L is the distance between transmitter 102 and receiver 104, and f is the signal frequency.

The signal frequency (f) used by signal generating device 100 is chosen such that the attenuation value in the formula above observed will represent a differential from the original signal transmitted (from transmitter 102) versus that received (by receiver 104). Signal frequency (f) may be, for example, in the range of 1 to 100 MHz. Thus, the attenuation value is a derivative of all of the biological tissues in the sampled cross section of a person's head between transmitter 102 and receiver 104. The head and brain matter within each signal generating device 100 signal sampling cross section differs based on content and type of tissue in scope for each signal sampling. A single sampling of the brain structure by signal generating device 100 is directly related to the structural content of the human being analyzed. Collecting multiple attenuation samplings may generate a brainprint that is composed of the attenuation across the human head horizontally from the front (anterior) to the back (posterior) regions of the head. Each attenuation number represents a constant structure of the head and brain material measured. The brain material of the human brain differs regionally from the front to the anterior of the head. There are size and tissue differences within the human brain's structure. These are taken as a derivative of the sum from the cross section samplings and rolled up into a brainprint composed of many regional samplings that is unique to the human being analyzed.

Collection of a biometric identity signature may be obtained because many of the attenuation coefficients of biological tissues/cells are known. For example, Table 1 lists some common attenuation values that were determined based on ultrasound frequencies of 1 MHz:

TABLE 1

| Material | A (dB/(MHz · cm)) |
|---|---|
| Air | 1.64 |
| Blood | 0.2 |
| Bone, cortical | 6.9 |
| Bone, trabecular | 9.94 |

TABLE 1-continued

| Material | A (dB/(MHz · cm)) |
|---|---|
| Brain | 0.6 |
| Connective Tissue | 1.57 |
| Fat | 0.48 |
| Marrow | 0.5 |
| Muscle | 1.09 |
| Soft Tissue (avg.) | 0.54 |
| Water | 0.0022 |

The attenuation coefficients from ultrasonic analysis are based on energy reflections from specific cellular matter. Attenuation coefficients taken from MRI studies may be more even more specific to cell types composing tissues because the signaling in the MRI process from the protons itself is attenuated during the signal transmission process from the cellular material composing biological tissue in the human body prior to it reaching the MRI receivers. Thus, the 2D attenuation values taken by signal generating device 100 can be directly related to the 3D MRI image data of the individual whose brainprint has been taken by signal generating device 100. MRI can serve as a control validation of the biometric identity signature technology. The attenuation measured by signal generating device 100 should be calculable from an MRI image of the person in question. The calculation verifies that the biometric identity signature from signal generating device 100 is a viable identity method.

Signal generating device 100 does not provide structural resolution for the composition of the brain at each sampling point with granularity like the MRI can. Instead, signal generating device 100 takes the attenuation value as a derivative of the sum of the cellular tissue structures traversed in the reference sampling. The MRI, however, can reveal all of the cellular tissue structures in the relevant cross-section used by signal generating device 100 due to quantum excitation derived from magnetics and radio signal energy, and can therefore be used as a validating control of the attenuation measurements.

Figure 6A:
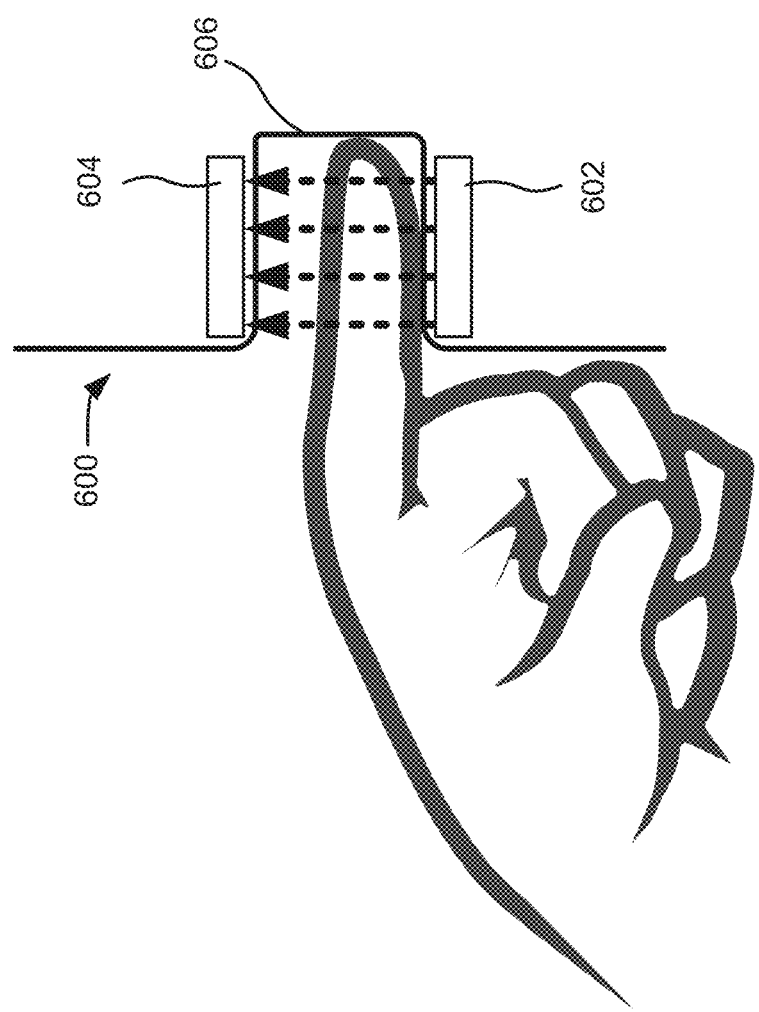
FIGS. 6A and 6B are simplified schematics of a device to collect attenuated signal information from a person's finger, according to other implementations described herein.
Figure 6B:
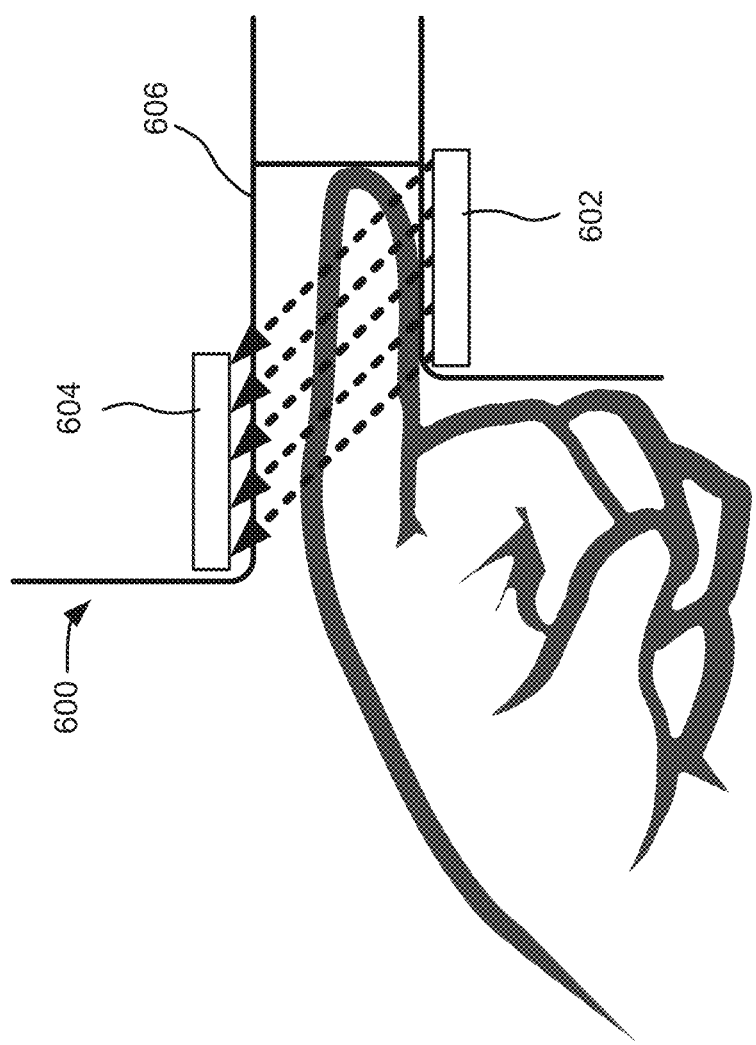

FIGS. 6A and 6B are simplified schematics of a device 600 to collect attenuated signal information from a person's finger. Device 600 may include a transmitter 602 and receiver 604 mounted in a platform 606 configured to receive a person's finger. Similar to transmitter 102 and receiver 104 of signal generating device 100, transmitter 602 may be configured to transmit analog signals through a portion of a person to corresponding receiver 604. The signals are configured to be sufficiently weak in nature such that the signal to noise ratio will change as the analog signal traverses through the finger due to attenuation of the signal. The transmitted signal may be compared to the received signal to determine a loss for the signal. The loss of signal due to attenuation is a function of the biological material (e.g., of the person's finger) between transmitter 602 and receiver 604. In one implementation, transmitter 602 and/or receiver 604 may move within the structure of device 600 to generate samples at multiple points across the finger. In another implementation, device 600 may use multiple transmitters 602 and/or receivers 604 to generate multiple samples.

Platform 606 may be configured to position a finger consistently relative to transmitter 602 and receiver 604. For example, platform 606 may control the insertion depth of the finger into platform 606. In other implementations, platform 606 may include visible guides or markings to show a user where to place a finger. In still other implementations, platform 606 may include movable side walls (not shown) to center a finger over transmitter 602 and under receiver 604. Additionally, or alternatively, platform 600 may be incorporated as an attachment for a mobile device (e.g., computing device 110). For example, platform 600 may take the form of a retractable tube configured to receive a person's finger as part of a user authentication system for the mobile device.

Relative to the brainprint sampling shown in FIGS. 1-5B, the signal strength of signals from transmitter 602 may be weaker than signals from transmitter 102 since there is a smaller biological tissue cross section involved with a finger than with a person's head. Thus, the applied signal transmitted for identifying a biometric identity signature for the finger would be adjusted lower for accuracy. As shown in FIG. 6A, transmitter 602 and receiver 604 may be configured to transmit signals across a smallest cross-section of the person's finger. As shown in FIG. 6B, transmitter 602 and receiver 604 may be configured to transmit signals diagonally across a larger cross-section of a person's finger.

Signal strength measurements from transmitter 602 and receiver 604 may be transmitted to computing device 110 (FIG. 1) for storage and/or comparison of a biological identity signature relative to the person's hand. For example, computing device 110 may calculate attenuation values between transmission signal strength values and received signal strength values to generate an identity signature for the person. In one implementation, computing device 110 may express the identity signature as a derivative of a sum of the attenuation values. In one implementation, the identity signature may be associated with another identifier for the person (e.g., a user name, password, etc.), stored (e.g., in a memory), and used for comparison with a subsequently-obtained identity signature to verify the identity of the person. In another implementation, the identity signature may be used for comparison with a previously-stored identity signature to verify the identity of the person.

Figure 7:
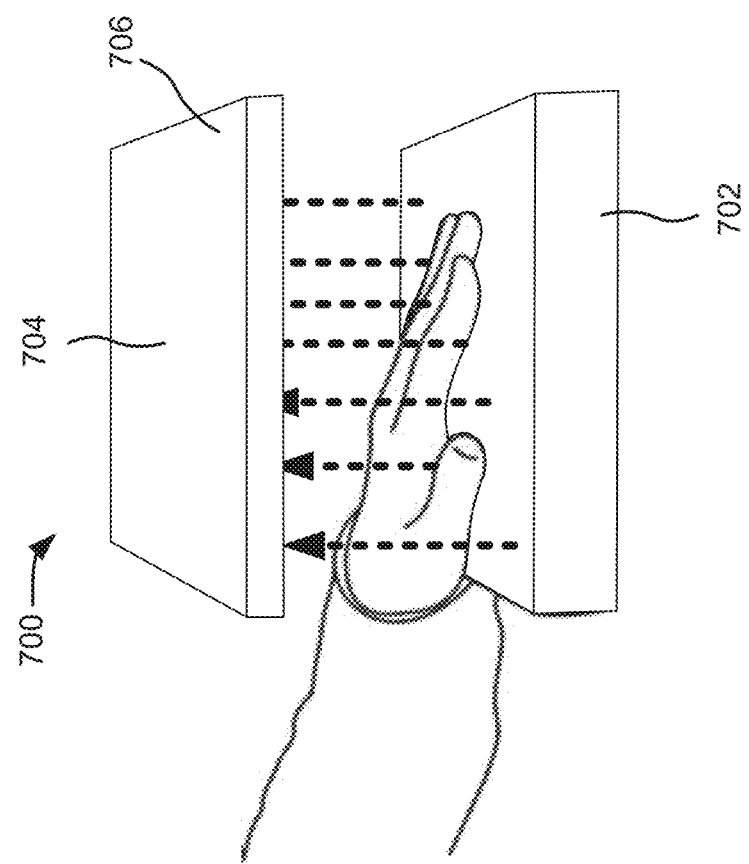
FIG. 7 is a simplified schematic of a device to collect attenuated signal information from a person's hand, according to another implementation described herein.

FIG. 7 is a simplified schematic of a device 700 to collect attenuated signal information from a person's hand. Device 700 may include a transmitter 702 and receiver 704 mounted in a platform 706 configured to receive a person's hand. Similar to transmitter 602 and receiver 604 of signal generating device 600, transmitter 702 may be configured to transmit analog signals through a portion of a person to corresponding receiver 704. The signals are configured to be sufficiently weak in nature such that the signal to noise ratio will change as the analog signal traverses through the hand due to attenuation of the signal. The transmitted signal may be compared to the received signal to determine a loss for the signal. Transmitter 702 and/or receiver 704 may move within the structure of device 700 or multiple transmitters 702 and/or receivers 704 may be used to generate samples at multiple points across the hand.

Platform 706 may be configured to position a hand consistently relative to transmitter 702 and receiver 704. For example, platform 706 may control the insertion depth of the hand into platform 706. In other implementations, platform 706 may include visible guides or indentations to show a user where to position the fingers or palm. Similar to device 600 described above, the signal strength of transmitter 704 may be adjusted to reflect the cross section involved with a hand in contrast with other body parts.

Signal strength measurements from transmitter 702 and receiver 704 may be transmitted to computing device 110 (FIG. 1) for storage and/or comparison of a biological identity signature relative to the person's hand. For example, computing device 110 may calculate attenuation values between transmission signal strength values and received signal strength values to generate an identity signature for the person. In one implementation, computing device 110 may express the identity signature as a derivative of a sum of the attenuation values.

Figure 8:
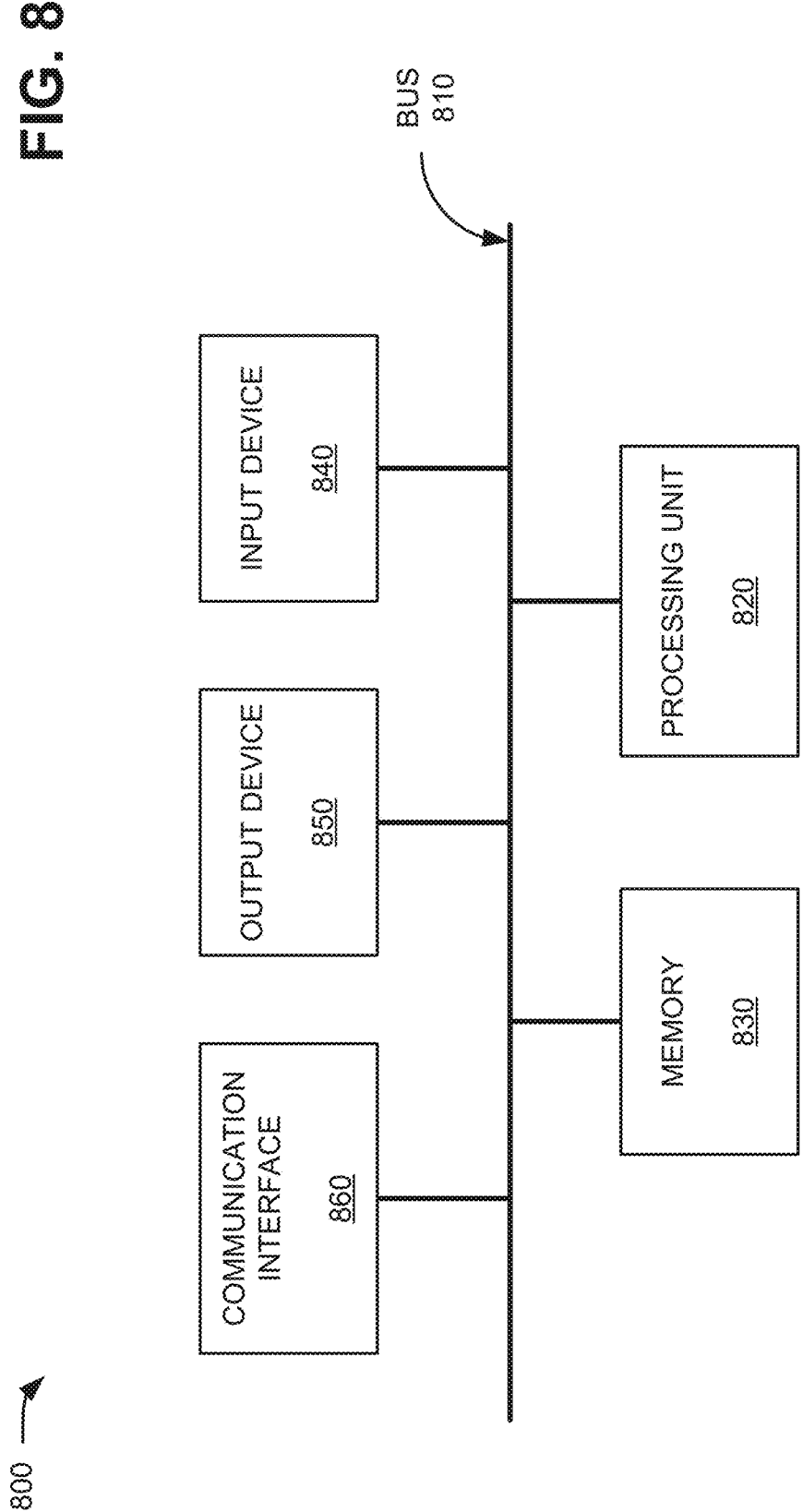
FIG. 8 is a block diagram of components of the computing device of FIG. 1.

FIG. 8 is a diagram of exemplary components of computing device 110. As shown in FIG. 8, computing device 110 may include a bus 810, a processing unit 820, a memory 830, an input device 840, an output device 850, and a communication interface 860.

Bus 810 may permit communication among the components of computing device 110. Processing unit 820 may include one or more processors or microprocessors that interpret and execute instructions. In other implementations, processing unit 820 may be implemented as or include one or more application specific integrated circuits (ASICs), field programmable gate arrays (FPGAs), or the like.

Memory 830 may include a random access memory (RAM) or another type of dynamic storage device that stores information and instructions for execution by processing unit 820, a read only memory (ROM) or another type of static storage device that stores static information and instructions for the processing unit 820, and/or some other type of magnetic or optical recording medium and its corresponding drive for storing information and/or instructions.

Input device 840 may include a device that permits an operator to input information to computing device 110, such as a keyboard, a keypad, a mouse, a pen, a microphone, one or more biometric mechanisms, and the like. Output device 850 may include a device that outputs information to the operator, such as a display, a speaker, etc.

Communication interface 860 may include a transceiver that enables computing device 110 to communicate with other devices and/or systems. For example, communication interface 860 may include mechanisms for communicating with other devices, such as other devices of system 100. Each of such other devices of system 100 may include its respective communication interface 860 to achieve such communication.

As described herein, computing device 110 may perform certain operations in response to processing unit 820 executing software instructions contained in a computer-readable medium, such as memory 830. A computer-readable medium may include a tangible, non-transitory memory device. A memory device may include space within a single physical memory device or spread across multiple physical memory devices. The software instructions may be read into memory 830 from another computer-readable medium or from another device via communication interface 860. The software instructions contained in memory 830 may cause processing unit 820 to perform processes described herein. Alternatively, hardwired circuitry may be used in place of or in combination with software instructions to implement processes described herein. Thus, implementations described herein are not limited to any specific combination of hardware circuitry and software.

Although FIG. 8 shows exemplary components of computing device 110, in other implementations, computing device 110 may include fewer components, different components, differently arranged components, or additional components than those depicted in FIG. 8. As an example, in some implementations, a display may not be included in computing device 110. In these situations, computing device 110 may be a "headless" device that does not include an input device. Alternatively, or additionally, one or more components of computing device 110 may perform one or more other tasks described as being performed by one or more other components of computing device 110.

FIG. 9 is a flow diagram of an exemplary process 700 for detecting a biometric identity via signal attenuation, according to an implementation described herein. In one implementation, process 900 may be performed by signal generating device 100 and computing device 110. In other implementations, process 900 may be performed by one or more devices including or excluding signal generating device 100 or computing device 110.

Process 900 may include identifying a signal strength for measuring attenuation through a particular body part (block 910). For example, for the configuration of signal generating device 100, a signal strength for transmitter 102 may be selected based on the distances between transmitter 102 and receiver 104, the types of tissue (and their respective tissue coefficients) for a human head, and a signal frequency. The signal strength may be selected so that measurable attenuation can be expected between signals from transmitter 102 and receiver 104.

Process 900 may also include aligning one or more signal transmitters and receivers for obtaining cross-sectional measurements of the body part (block 920). For example, signal generating device 100 may be placed on a person's head, resting on the ears and nose, to provide a consistent, repeatable position of signal generating device 100 on the person's head. In other configurations, a finger, hand, or other body part may be inserted onto a platform in a consistent, repeatable position.

Process 900 may further include transmitting one or more analog signals of known signal strength from a first transmitter position (block 930), receiving and recording the signal at a first receiver position (block 940), and calculating an attenuation based on the transmitted signal and the received signal (block 950). For example, in the context of signal generating device 100, transmitter 102 may send n (where n is greater than one) analog signals to receiver 104 beginning at a position in the front of the head. The signals sent are selectively configured to be weak in nature such that the signal to noise ratio will change as the analog signal traverses a person's head (including the brain) from the left side (with transmitter platform 220) to the right side (with receiver platform 210) due to attenuation of the signal. The first signal received by receiver 104 may be compared to the first signal sent from a first position ($P_1$). The loss of signal due to attenuation will be a function of the biological material between transmitter 102 and receiver 104 of the signal generating device 100.

Process 900 may also include determining if additional signal samples are to be obtained (block 960). If additional signal samples are to be obtained (block 960—YES), process 900 may return to block 930 to transmit a signal from a next position. If no additional signal samples are to be obtained (block 960—NO), process 900 may further include compiling the signal measurements to obtain an identity signature (block 970). For example, computing device 110 may calculate a derivative of the sum of the signal measurements to reflect a digital biometric identity based on the signal attenuation.

Process 900 may additionally include comparing the identity signature with one or more previously-stored identity signatures (block 980). For example, computing device 110 may compare the biological identity signature obtained using signal generating device 100 with a previously stored identity signature or a group of stored signatures. In one implementation, computing device 110 may compare the biological identity signature with a particular stored signature based on, for example, a user name or other supplemental identity information. Thus, the biological identity signature may be used in conjunction with other identity methods to verify the identity of a person.

As body parts may change slightly over time, systems and methods described herein may account for error and/or gradual change of a particular biological identity signature. That means that the absolute error of measurement will be taken into consideration with each biometric identity signature, and acceptable drift taken into consideration over time to simplify the user experience and avoid re-enrollment. Re-enrollment may include providing a variety of authentication techniques using supplemental identification information to verify and re-set the biometric identity signature of a particular person.

According to an implementation described herein, a system may include a signal generating device and a computing device. The signal generating device may include a transmitter and a receiver. The signal generating device may be configured to transmit analog signals of known transmission signal strengths through a body part of a person, and may receive the analog signals after the analog signals have passed through the body part. The computing device may be configured to identify the transmitted signal strengths of the analog signals from the transmitter, identify the received signal strengths of the analog signals at the receiver, and calculate attenuation values between the transmitted signal strengths and the received signal strengths to generate an identity signature that corresponds to the body part of the person.

Systems and methods described herein for detecting a biometric identity via signal attenuation may employ conventional computing equipment using software (without the need for dedicated ASIC chip sets). The signal generating device may be made from analog transmission/receiving equipment that is relatively low in cost to design and manufacture. In another implementation, ASIC chip technology can be used to speed up the processing on the signal generating device. In another implementation RAM, ROM, or other chip storage in the signal generating device or on the ASIC can be used to keep signaling data for quick comparison, etc. Thus, functions described herein as being performed by one device (such as a computing device 110) may be performed by signal generating device 100 in other implementations. The identity signature based on the signal attenuation sampling can be stored on signal generating device 100, computing device 110, or remotely stored for access via a network. Additionally, trade-offs of accuracy and complexity may be balanced carefully selecting the number of sampling reference points. A greater number of sampling points may increase accuracy and lengthen the sampling/processing times.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 9, the order of the blocks may be modified in other implementations. Further, non-dependent blocks may be performed in parallel.

To the extent the aforementioned embodiments collect, store, or employ personal and/or biometric information provided by and/or detected from individuals, it should be understood that such information shall be used in accordance with all applicable laws concerning protection of personal information. Typically, a user inherently grants permission to access his, or her, biometric information by placing a halo around his, or her, head, or placing his, or her, finger or hand into a fingerprint or handprint scanner, respectively. Additionally, the collection, storage, and use of person and/or biometric information may be subject to consent of the individual to such activity, for example, through well known "opt-in" or "opt-out" processes as may be appropriate for the situation and type of information. Storage and use of personal and/or biometric information may be in an appropriately secure manner reflective of the type of information, for example, through various encryption and anonymization techniques for particularly sensitive information.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
aligning one or more transmitters and one or more receivers to transmit pulse signals through a body part of a person;
transmitting, by the one or more transmitters and through different sections of the body part, pulse analog signals, of a known transmission signal strength, from different reference points;
receiving, by the one or more receivers, the pulse analog signals, transmitted from the different reference points, after the analog signals have passed through the body part, wherein the received analog signal from each of the different reference points passes through one of the different sections of the body part;
identifying a received signal strength of each of the analog signals at the one or more receivers; and
calculating attenuation values, from each of the different reference points corresponding to the different sections of the body part, between the known transmission signal strengths and the received signal strengths to generate an identity signature,
wherein at least one of the one or more transmitters or one of the one or more receivers is spaced from the body part.

2. The method of claim 1, further comprising:
identifying a particular transmission signal strength for the analog signals that will provide measurable attenuation based on the biological cellular material that is in the body part.

3. The method of claim 1, wherein aligning the transmitter and receiver further comprises:
positioning the transmitter and receiver so as to transmit signals through a cross-section of the body part in a repeatable manner.

4. The method of claim 1, wherein transmitting the analog signals further comprises:
transmitting one of the analog signals from a first reference point of the different reference points before transmitting another of the analog signals from a first reference point of the different reference points.

5. The method of claim 1, wherein transmitting the analog signals further comprises:
transmitting the analog signals at different frequencies.

6. The method of claim 1, wherein calculating attenuation values between the transmission signal strengths and the received signal strengths to generate an identity signature further comprises:
determining a derivative of a sum of the attenuation values.

7. The method of claim 1, further comprising:
associating the identity signature with another identifier of the person; and
storing, in a memory of a computing device, the identity signature.

8. The method of claim 1, further comprising:
comparing the identity signature with a previously-stored identity signature for the person.

9. The method of claim 1, further comprising:
sending, to a computing device and via a communications interface, the transmission signal strengths and the received signal strengths.

10. The method of claim 1, wherein the analog signals includes radio frequency (RF) signals in a range of 1 MHz to 100 MHz.

11. A system, comprising:
a pulse signal generating device, including one or more transmitters and one or more receivers, configured to:
transmit pulse analog signals, of known transmission signal strengths, from different reference points through different sections of a body part of a person, and
receive the analog signals after the analog signals have passed through the different sections of the body part, wherein the received analog signal from each of the different reference points passes through one of the different sections of the body part;
wherein at least one of the one or more transmitters or one of the one or more receivers is spaced from the body part; and
a computing device configured to:
identify the transmitted signal strengths of the analog signals from the one or more transmitters,
identify the received signal strengths of the analog signals at the one or more receivers, and
calculate attenuation values, from each of the different reference points corresponding to the different sections of the body part, between the transmitted signal strengths and the received signal strengths to generate an identity signature that corresponds to the sum of the matter of the body part of the person.

12. The system of claim 11, wherein the signal generating device further includes:
a communication interface to transmit signal readings from the transmitted signals and the received signals to the computing device.

13. The system of claim 11, wherein the signal generating device is further configured to:
transmit the analog signals at a particular signal strength to provide measurable attenuation based on the biological cellular material that is in the body part.

14. The system of claim 11, wherein the signal generating device is further configured to:
position the one or more transmitters and one or more receivers around the body part so as to pass signals through a cross-section of the body part in a repeatable manner.

15. The system of claim 11, wherein the signal generating device is further configured to:
transmit the analog signals from different positions relative to the body part.

16. The system of claim 11, wherein the computing device is further configured to:
store, in a memory, the identity signature associated with another identifier for the person.

17. The system of claim 11, wherein the computing device is further configured to:
compare the identity signature with a previously-stored identity signature for the person.

18. A non-transitory computer-readable medium, storing instructions executable by one or more processors, the non-transitory computer-readable medium comprising one or more instructions to:

provide, to one or more transmitters that transmit pulse analog signals through different sections of a body part, a transmission signal strength value to produce measurable attenuation based on biological cellular material that is in a body part of a person;

receive, from one or more receivers, received signal strength values of the pulse analog signals, from the one or more transmitters, that have passed through the different sections of the body part, wherein the received analog signal from each of the different reference points passes through one of the different sections of the body part; and calculate attenuation values between the transmission signal strength value and the received signal strength values to generate an identity signature for the person, wherein at least one of the one or more transmitters or one of the one or more receivers is spaced from the body part.

19. The non-transitory computer-readable medium of claim 18, further comprising one or more instructions to:
store the identity signature associated with another identifier for the person.

20. The non-transitory computer-readable medium of claim 19, further comprising one or more instructions to:
compare the identity signature with a subsequently-obtained identity signature to verify the identity of the person.

* * * * *